Feb. 22, 1966

C. O. JONKERS ET AL  3,236,322
TRACTORS OF THE KIND COMPRISING
A FRAME AND A CHANGE SPEED GEAR

Filed June 25, 1962  3 Sheets-Sheet 1

INVENTORS
CORNELIUS OTTO JONKERS
FOPPE HILBERTUS FOCKENS
BY
Mason, Mason & Albright
Attorneys

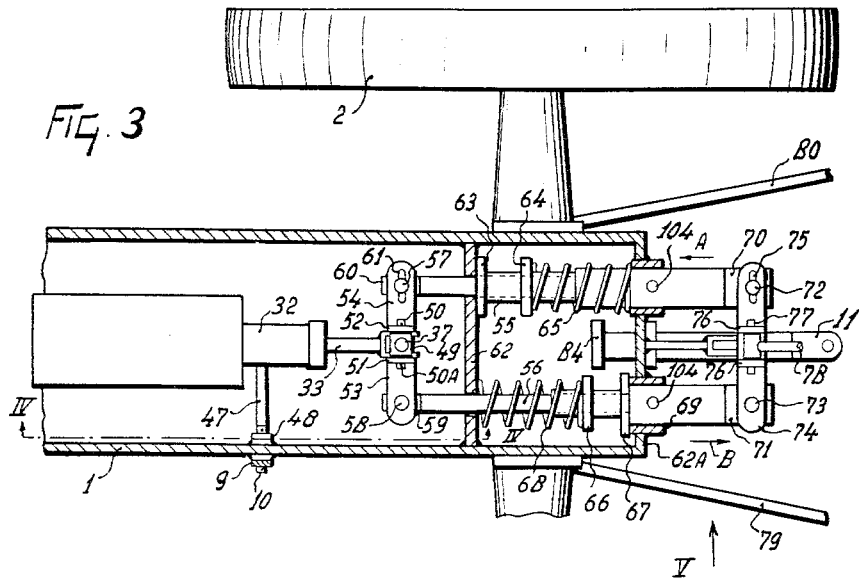
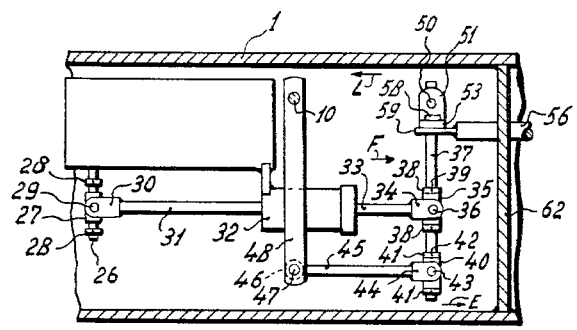

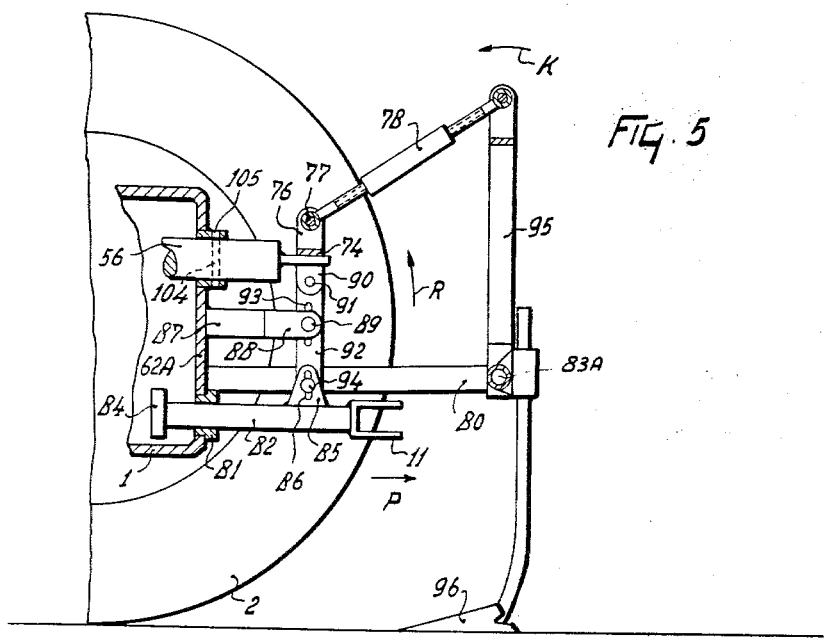
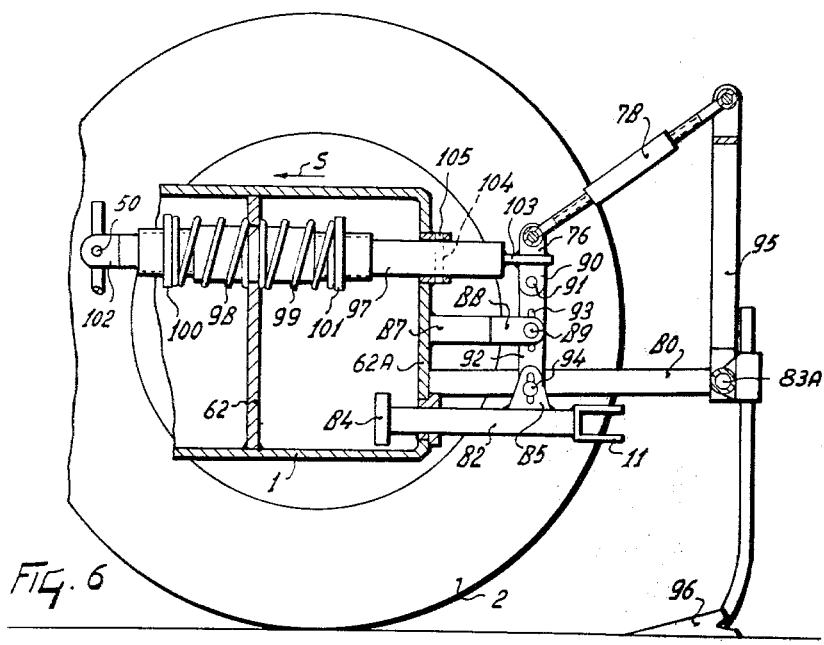

3,236,322
TRACTORS OF THE KIND COMPRISING A
FRAME AND A CHANGE SPEED GEAR
Cornelius Otto Jonkers, Delft, and Foppe Hilbertus
Fockens, Maasland, Netherlands, assignors to C. van
der Lely N.V., Maasland, Netherlands, a Dutch limited-
liability company
Filed June 25, 1962, Ser. No. 205,033
Claims priority, application Netherlands, July 18, 1961,
267,230
13 Claims. (Cl. 180—14)

This invention relates to tractors, the term "tractor" being employed herein to denote a locomotive unit capable of propelling an implement or a vehicle, and the invention relates particularly but not exclusively to agricultural tractors capable of pulling or pushing, or both agricultural implements.

According to one aspect of the invention, there is provided a tractor which includes a frame, an engine capable of driving, through a transmission mechanism, at least one driven ground wheel of the tractor, and coupling means by which the tractor can be coupled to an implement, or a vehicle, intended to be propelled by the tractor, the transmission mechanism having a variable transmission ratio so that, for a given engine speed, the speed of rotation of the or each driven ground wheel can be varied, the coupling means including at least one displaceable member which can move under the influence of external forces acting upon the implement or vehicle when propelled by the tractor and when such forces exceed predetermined values, and the displaceable member or members being operatively connected to the transmission mechanism by way of at least one movable connecting member, the arrangement being such that, when the said external forces exceed the said predetermined values, the displaceable member or at least one of the displaceable members moves, thereby causing the movable connecting member or at least one of the movable connecting members to move in such a way as to change the transmission ratio of the transmission mechanism so that, for a constant engine speed, the speed of rotation of the or each driven ground wheel of the tractor will decrease. In normal operation, the effect will be that the tractive effort exerted at the driven ground wheel or wheels of the tractor will increase, when the said external forces exceed the said predetermined values.

According to a second aspect of the invention, there is provided a tractor which includes a frame, an engine capable of supplying, through a control mechanism, tractive effort to at least one driven ground wheel of the tractor, and coupling means by which the tractor can be coupled to an implement, or a vehicle, intended to be propelled by the tractor, the coupling means including a coupling device consisting of an interconnection member for towing and/or pushing the implement or vehicle and movable relatively to the frame from a predetermined position in which the interconnection member tends to be held by a maintaining mechanism, the tractor including at least one movable connecting member which moves in response to movement of the interconnection member so as to cause the control mechanism to vary the said tractive effort in response to movement of the interconnection member. The term "interconnection member" includes a mounting bracket, or a mounting beam, or the like member, by means of which a tractor can be coupled to the implement or the vehicle.

For a better understanding of the invention, and to show how the same may be carried into effect, reference will now be made, by way of example, to the accompanying drawings in which:

FIGURE 3 is an enlarged sectional view, taken along the line III—III of FIGURE 1;

FIGURE 4 is a sectional view, taken along the line IV—IV of FIGURE 3;

FIGURE 5 is an enlarged part-sectional side elevation of the rear end of the tractor, taken in the direction of the arrow V of FIGURE 3; and FIGURE 6 is similar to FIGURE 5, but relates to a modification of the ararngement shown in FIGURES 3 and 5.

Figure 1:
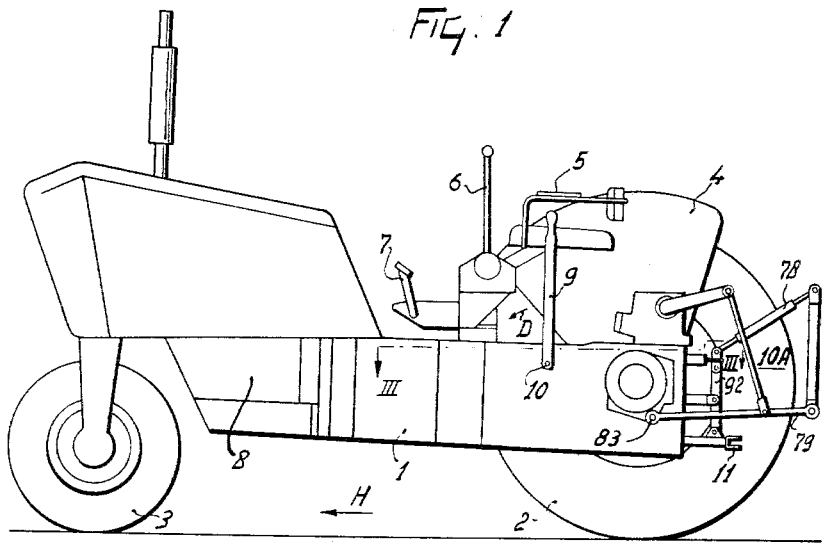
FIGURE 1 is a side elevation of a tractor according to the invention, one wheel of the tractor having been omitted.

The tractor shown in FIGURE 1 includes a frame 1 which is supported by two driven ground wheels (of which only one is indicated at 2) and a steerable ground wheel 3. The driven ground wheels 2 are screened by mud guards, of which one is indicated at 4. Mounted upon the frame 1 is a driver's seat 5. This seat, together with a steering rod 6 and suitable control pedals (of which one is indicated at 7), are adapted to turn about a vertical axis and can be fixed in any one of a plurality of angularly spaced positions. In the frame of the tractor is furthermore accommodated an engine (indicated at 8) which can be coupled to the driven wheels 2 via a transmission mechanism arranged in the frame. The transmission mechanism can be actuated by means of a lever 9 which is fastened to a shaft 10 (FIGURES 1, 3 and 4), the shaft being journalled in the frame. The transmission mechanism is shown diagrammatically in FIGURE 2 and its operation will be described more fully hereinafter.

The tractor also includes coupling means, in the form of a coupling mechanism comprising a hydraulically operable lifting device 10A, together with a coupling device consisting of an interconnection member in the form of a mounting bracket 11, either of which can be employed to couple implement or vehicles to the tractor.

Figure 2:
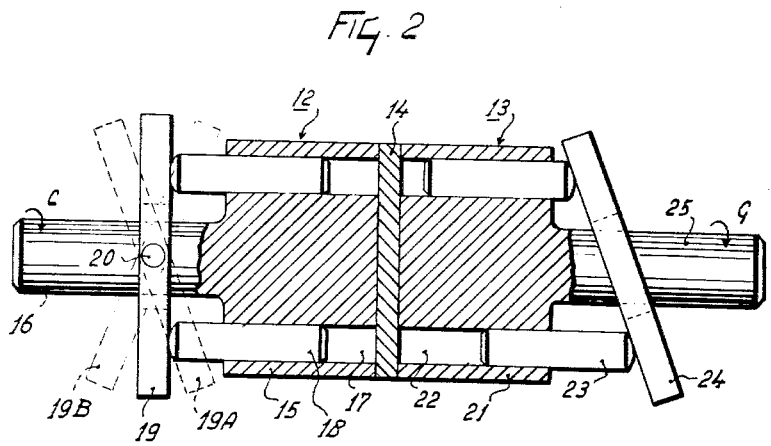
FIGURE 2 shows diagrammatically a transmission mechanism suitable for use in the tractor of FIGURE 1.

The transmission mechanism shown in FIGURE 2 is of generally known form and comprises a swashplate-type pump 12 and a swashplate-type motor 13, which are separated from each other by a stationary plate 14, formed with elongated holes (not shown) which establish suitable communication between the pump and the motor. The pump 12 includes a housing 15 which is secured to a shaft 16 coupled with the engine 8, the housing 15 having a circular array of axially extending bores 17 in which plungers 18 are adapted to slide. The plungers 18 bear at one end on a swashplate 19 which is angularly movable upon a shaft 20 journalled in the frame and extending at right angles to the center line of the shaft 16. The motor 13 includes a housing 21 having a circular array of axially extending bores 22 in which plungers 23 are adapted to slide. The plungers 23 bear at one end on a swashplate 24 which is arranged so that the plane through the ends of the plungers 23 bearing on the plate 24 is inclined to the center line of a shaft 25 to which the housing 21 of the motor is secured. The shaft 25 is in line with the shaft 16 and is coupled in known manner with the driven wheels 2.

The shaft 20 (FIGURES 2, 4) has secured to it one end of an arm 26 the other end of which slidably carries a sleeve 27. Movement of the sleeve 27 along the arm 26 is limited by collars 28 which are fastened to the arm 26 by means of pins. The sleeve 27 has trunnions 29 which extend parallel to the shaft 20 and at right angles to the longitudinal axis of the arm 26, by means of which trunnions a U-shaped bracket 30, fastened to a rod 31, is coupled with the sleeve 27. The parallel limbs of the bracket are located at opposite sides of the sleeve 27.

The rod 31 is the output member of a hydraulically operated position-sensitive servomechanism, of known form and indicated at 32, the input member of which is a control rod 33 to the free end of which a U-shaped bracket 34 is secured. The parallel limbs of the bracket 34 are located one on each side of a sleeve 35, the sleeve being pivoted to the bracket by means of horizontally extending trunnions 36 which extend at right angles to the longitudinal axis of the tractor. The sleeve 35 surrounds a coupling rod 37 which is secured against displacement in the sleeve 35 by means of collars 38, lying one on each side of the sleeve and fastened to the rod by means of pins 39. On the lower end of the rod 37, projecting beneath the sleeve 35, is mounted a sleeve 40 which is secured against displacement along the rod by means of collars 41, lying one on each side of the sleeve and fastened to the rod 37 by means of pins 42. With the aid of trunnions 43, extending parallel to the trunnions 36, the parellel limbs of a U-shaped bracket 44, lying one on each side of the sleeve 40, are pivoted to the sleeve 40. The bracket 44 is secured to one end of a rod 45 to the other end of which is fastened an eye 46, by means of which the rod is pivoted to a shaft 47 (FIGURES 3, 4), extending parallel to the trunnions 43. The shaft 47 is secured to one end of an arm 48, the other end of which is fastened to the shaft 10, so that rotary movement of the shaft 10 by actuation of the lever 9 (FIGURES 1, 3) results in angular movement of the arm 48.

The end of the rod 37 projecting above the sleeve 35 is journalled in a hole provided in a block 49 (FIGURE 3), so that the rod 37 is movable through the block 49 in the direction of the length of the rod. The block 49 is provided with trunnions 50 (FIGURES 3, 4) which extend parallel to the trunnions 36. The trunnions 50 carry the flanged ends 51 and 52 of arms 53 and 54 which are secured against disengagement from the trunnions 50 by means of pins 50A passed through the said trunnions; the block 49 can thus move with the arms 53 and 54.

To the outer ends of the arms 53 and 54 are respectively pivoted, by means of vertical pins 58 and 57, the ends of two parallel shafts 56 and 55 which extend in the longitudinal direction of the tractor, the pins 58 and 57 respectively engaging ears 59 and 60 which are secured to the shafts 56 and 55.

The pin 57 is located in an elongated hole 61 in the arm 54, whereas the pin 58 is arranged in a hole in the arm 53, which hole closely receives the pin 58. The pins 57 and 58 are provided with heads, such that the arms 53 and 54 are enclosed between the ears 59 and 60 and the heads of the pins.

Each of the two shafts 55 and 56 is journalled in two partition plates 62 and 62A, which form part of the frame 1. The shaft 55 is provided with a screwthreaded portion on which two nuts 63 and 64 are mounted. Between the nut 64 and the partition plate 62A, the shaft 55 is surrounded by a pressure spring 65. In the position shown in FIGURE 3, the nut 63 bears on the partition plate 62, so that this nut constitutes a stop limiting movement of the shaft 55 in the direction of the arrow A.

The shaft 56 also has a screwthreaded portion, on which two nuts 66 and 67 are mounted. Between the nut 66 and the partition plate 62, the shaft 56 is surrounded by a pressure spring 68. In the position shown in FIGURE 3, the nut 67 bears upon the bearing 69, provided in the partition plate 62A, for accommodating the shaft 56, so that this nut constitutes a stop limiting movement of the shaft 56 in the direction of the arrow B, opposite to the direction of the arrow A.

To the ends of the shafts 55 and 56, which project beyond the frame 1, are respectively secured horizontal ears 70 and 71. With the aid of pins 72 and 73, these ears, and thus the shafts 55 and 56, are coupled to opposite ends of a plate 74 which extends transversely of the longitudinal direction of the tractor. The pin 73 is accommodated in a hole provided in the plate 74, which hole closely receives the pin 73, whereas the pin 72 is arranged in an elongated hole 75 in the plate 74. The pins are provided with heads, so that the plate 74 cannot fall off the pins.

Between the two pins 72 and 73, two vertical ears 76 are secured to the plate 74 (see FIGURES 3 and 5). Holes provided in these ears accommodate a horizontal pin 77, extending transversely to the longitudinal direction of the tractor, by means of which pin the topmost arm 78 of the lifting device 10A is coupled with the frame of the tractor. The two lowermost arms 79 and 80 (FIGURES 3, 5) of the lifting device 10A are pivoted to the frame 1 of the tractor in known manner, as indicated at 83 in FIGURE 1.

The plate 74 is also provided with a pair of downwardly extending ears 90 which pivotally carry, by means of a pin 91 extending between the ears, a downwardly extending coupling lever 92.

A bearing 81, mounted upon the partition plate 62A, holds a shaft 82, extending in the longitudinal direction of the tractor. To that end of the shaft 82 which projects beyond the frame, is secured the mounting bracket 11. At the other end of the shaft 82 there is provided a stop 84 which prevents the shaft 82 from being withdrawn from the bearing 81. To the upper side of the shaft 82 are secured two ears 85, in which vertically elongated holes 86 are provided. The ears 85 are connected to the lower end of the coupling lever 92, by means of a pin 94 slidable within the elongated holes 86. The frame of the tractor has furthermore secured to it a support 87, the outer end of which terminates in a U-shaped bracket 88, the parallel limbs of which carry a horizontal pin 89 which extends transversely to the longitudinal direction of the tractor, through an elongated hole 93 formed in the coupling lever 92.

In FIGURE 5, a coupling member 95 is linked to the arms 78, 79 and 80 of the lifting device 10A, a weeding implement 96 being fastened to the member 95.

The mechanism operates as follows.

The shaft 16 and the housing 15 of the pump 12 are set rotating by the engine, in operation, in the direction of the arrow C. If the rocking plate 19 occupies the neutral position shown in full lines, the plungers 18 are not displaced in the bores 17, so that no working fluid (for example, oil) is urged by the plungers 18 towards the motor 13.

If the lever 9 is moved forwards, in the direction of the arrow D (FIGURE 1), the rod 37 moves pivotally, in the direction of the arrow E (FIGURE 4), about the axis of the trunnions 50. Thus, the control rod 33 is displaced in the direction of the arrow F, and, by the action of the servomechanism 32, the rod 31 is consequently also displaced in the direction of the arrow F. the consequent anti-clockwise movement of the arm 26 causes the shaft 20 to rotate anti-clockwise, so that the swashplate 19 is angularly displaced, in an anti-clockwise direction, to a position such as that indicated at 19A (FIGURE 2). In this position of the rocking plate 19, the plungers 18 are displaced, in the direction of their length, in the bores 17, as the housing 15 turns. Thus, the plungers 18 urge oil out of the pump 12, and towards the motor 13, through the elongated holes (not shown) in the plate 14. The oil thus urged towards the motor 13 displaces the plungers 23 in the bores 22; thus, because of the presence of the swashplate 25, the housing 21 and shaft 25 of the motor 13 are caused to rotate in the direction of the arrow G. The shaft 25 of the motor 13 is so coupled with the driven wheels 2, that the result is that the tractor starts travelling forwards in the direction of the arrow H (FIGURE 1) in the same forward direction as that in which the lever 9 was moved relatively to the frame of the tractor.

If the lever is moved backwards from the position shown in FIGURE 1, that is to say in a direction opposite to that of the arrow D, the rods 33 and 31 will similarly move in a direction opposite to that of the arrow F, and the swashplate 19 will be angularly displaced in a clockwise direction, to a position such as that indicated at 19B (FIGURE 2). The direction of rotation of the pump 12 remaining the same, the motor 13 will in this case rotate in a direction opposite to that of the arrow G, so that the tractor will travel backwards, in the direction opposite to that of the arrow H.

In general, the transmission ratio between the motor and the pump, that is to say, the ratio of the speeds of angular rotation of the shafts 25 and 16, will depend upon the angular position of the swashplate 19, which position, in turn, depends upon the angle through which the lever 9 is turned with respect to the frame of the tractor. In a modification of the invention, not only the swashplate 19, but also the swashplate 24, may be made angularly adjustable.

Thus, in summary, assuming that the engine speed remains constant, so that the speed of rotation of the pump shaft 16 remains constant, then the speed of rotation of the driven ground wheels 2 will be determined by the angular displacement of the swashplate 19 from the neutral position shown in full lines in FIGURE 2. The angular position of the swashplate 19 can be controlled, as described, by the lever 9, but can also be controlled, as now to be described, by forces which are exerted upon the tractor by an implement or a vehicle which the tractor is propelling.

Referring to FIGURE 5, the tractor is there shown as arranged to pull along a weeding implement 96 which is so coupled with the tractor, by means of the lifting device 10A, that the implement is capable of pivotal movement about an axis 83A extending at right angles to the longitudinal axis of the tractor and located at the ends of the arms 79 and 80. When the tractor is caused to move forwards, in the direction of the arrow H (FIGURE 1), the lever having been moved forwards to tilt the swashplate 19 to a position 19A (FIGURE 2), the coupling member 95 (FIGURE 5) will tend to rotate anti-clockwise under the action of external forces exerted on the implement, such rotation being about the axis 83 and in the direction of the arrow K. External forces exerted upon the implement 96 are therefore transmitted, via the arm 78, to the plate 74, which tends to move, under the action of such forces in the direction of the arrow A (FIGURE 3). Since one end of the plate 74 is fastened to the shaft 55, which is prevented from moving in the direction of the arrow A by the nut 63 acting as a stop, that end of the plate 74 cannot move. The other end of the plate 74, however, is fastened to the shaft 56, which can move in the direction of the arrow A.

If the external forces exerted upon the implement 96, and thus the forces exerted by the arm 78 on the plate 74, exceed predetermined values, the shaft 56 will be displaced against the action of the spring 68, in the direction of the arrow A (FIGURE 3), causing the plates 53 and 54 together with the block 49 to pivot about the pin 57. The upper end of the rod 37, which is accommodated in the block 49, will therefore move in the direction of the arrow L (FIGURE 4), causing the rod 37 to pivot about the axis of the trunnions 43, so that the control rod 33 will be displaced to the left, in the direction opposite to that of the arrow F. From what has been described, it will be understood that the result will be that the swashplate 19 will be tilted from the position 19A towards the neutral position 19, so that the tractor will travel more slowly, while the speed of the engine remains the same. Thus the tractive force at the driven ground wheels 2 of the tractor increases. If, thereafter, the external forces exerted upon the implement decrease, then the various parts will tend to return, under the action of the spring 68, to their original positions, so that the tractor will again move forwards at the speed determined by the setting of the lever 9.

Referring to FIGURES 1 and 5, an implement which is intended to be pushed along by the tractor, can be coupled to the tractor by means of the lifting device 10A, in similar manner to the weeding implement 96. In such a case, the tractor will, during use, be driven backwards, in the direction opposite to that of the arrow H (FIGURE 1), at a speed determined by the angle through which the lever 9 is moved backwards, such movement of the lever 9 tilting the swashplate 19, as described above, to a position 19B (FIGURE 2). In this case, the external forces exerted on the pushed implement tend to turn the implement in a clockwise direction about the axis 83A, that is to say in the direction opposite to that of the arrow K (FIGURE 5). As a result, forces exerted by the arm 78, upon the plate 74, tend to move the plate 74 in the direction of the arrow B (FIGURE 3). The shaft 56 is prevented from moving under the action of such forces, since the nut 67 acts as a stop. Movement of the shaft 55 is resisted by the spring 65. If the external forces exerted upon the implement exceed predetermined values, then the shaft 55 will be displaced, against the action of the spring 65, in the direction of the arrow B (FIGURE 3), so that the plates 53 and 54 together with the block 49 pivot, in a clock-wise direction, about the pin 58. The rod 37 will therefore pivot about the axis of the trunnions 43, so that the rod 33 is shifted to the right, in the direction of the arrow F. The effect will be, that the swashplate 19 will be tilted from the position 19B towards the neutral position 19 shown in full lines in FIGURE 2, so that the tractor will move more slowly.

If, thereafter, the external forces exerted upon the implement decrease, the shaft 55 will tend to return, under the action of the spring 65, to its original position, so that the tractor will again move backwards at the speed determined by the setting of the lever 9.

Instead of employing the lifting device 10A to couple an implement to the tractor, the mounting bracket 11 may be employed instead, either to push along, or to pull along, an implement or a vehicle. If the implement or vehicle is pulled along, when the tractor is driven forwards, in the direction of the arrow H (FIGURE 1), the drawn implement or vehicle exerts, upon the shaft 82, a force in the direction of the arrow P (FIGURE 5). Under the action of this force, the lever 92 tends to turn in the anti-clockwise direction of the arrow R (FIGURE 5). Thus, the force exerted by the implement or vehicle is transferred to the plate 74, which thus tends to turn about the pin 72 and hence to shift the shaft 56 in the direction opposite to that of the arrow B (FIGURE 3). If the force exerted upon the mounting bracket 11 exceeds a predetermined value, the shaft 56 will again move in the direction of the arrow A (FIGURE 3) and, as described above, the result will be that, with the same engine speed, the tractor will be driven more slowly.

If, on the other hand, an implement or vehicle to be pushed along by the tractor is coupled to the bracket 11, and the tractor is driven backwards, in the direction opposite to that of the arrow H (FIGURE 1), then the speed of the tractor will similarly be decreased, when the force exerted upon the bracket by the implement or vehicle, exceeds a given value.

In a modification of the invention, the mounting bracket 11 is replaced by a displaceable mounting beam (not shown), which is suitably coupled with the shafts 55 and 56 and which may, for example, be linked to the frame of the tractor by means of two shafts extending in the longitudinal direction of the tractor.

In the modified arrangement shown in FIGURE 6, corresponding parts are designated by the same reference numerals as have been employed above. Instead of the two shafts 55 and 56, a single shaft 97 is journalled in the partition plates 62 and 62A. At opposite sides of the partition plate 62, the shaft 97 is surrounded by pressure springs 98 and 99, respectively, these springs being enclosed between the nuts 100 and 101 mounted upon screw-threaded portions of the shaft 97, and the partition plate 62. One end of the shaft 97 terminates in a U-shaped bracket 102, between the arms of which the block 49 (FIGURE 3) is arranged, the bracket 102 being pivoted to the block 49, by means of the trunnions 50. At the other end of the shaft 97, there is provided a horizontal plate 103, to which the ears 76 and 90 are secured. The springs 98 and 99 tend to held the shaft 97 in the position shown.

When, with the tractor moving forwards, an implement or vehicle is pulled along by the tractor and is coupled to the tractor either by means of the lifting device 10A or by means of the bracket 11, the external forces acting upon the implement or vehicle tend to move the shaft 97 to the left, in the direction of the arrow S, against the action of the spring 99. Such movement of the shaft 97 will cause (FIGURE 4) the rod 37 to pivot, in the counterclockwise direction of the arrow L, about the axis of the trunnions 43. Thus, as described above, while the engine speed of the tractor remains constant, the forward speed of the tractor will be reduced when the external forces acting upon the implement or vehicles increase.

Similarly, when, with the tractor moving backwards, an implement or vehicle is pushed along by the tractor and is coupled to the tractor either by means of the lifting device 10A or by means of the bracket 11, the external forces acting upon the implement or vehicle tend to move the shaft 97 to the right, in the direction opposite to that of the arrow S, against the action of the spring 98. Consequently, while the engine speed of the tractor remains constant, the backward speed of movement of the tractor will be reduced when the external forces acting upon the implement or vehicle increase.

In the case of each of the two embodiments which have been described, the compression forces of the springs 65, 68, 98 and 99 can be adjusted by turning the nuts 64, 66, 100 and 101, on which the springs bear at one end. These compression forces determine the forces which can be exerted, by the implement or vehicle, upon the tractor, before the transmission mechanism is changed.

From FIGURES 3, 5 and 6, it will furthermore be seen that the shafts 55, 56 and 97 are provided with diametral holes 104, and that corresponding holes 105 are provided in the bearings which are secured to the partition plate 62A and which accommodate these shafts. The insertion of suitable pins through a pair of corresponding holes 104 and 105 will prevent the relevant shaft from moving, and so prevent the tractor speed from being controlled, in the manner described above, by forces exerted by implements or vehicles propelled by the tractor.

It is to be understood that the invention is not limited to the particular form of transmission mechanism described with reference to FIGURE 2. Any other suitable transmission mechanism having a variable transmission ratio, that is to say a transmission mechanism having an output shaft the rotational speed of which can be varied while the rotational speed of the input shaft to the transmission mechanism remains constant with the engine speed, can be used.

What we claim is:

1. A tractor comprising a frame, an engine drivingly connected to a ground wheel through a transmission mechanism having a variable transmission ratio, coupling means, said coupling means having a first displaceable interconnection member responsive to changing draft forces exerted on said coupling means, connecting means operatively associated with said transmission to vary said ratio, said connecting means being spring biased in opposite directions, lever means pivotably connected to said frame by hinge means defining an axis, said first interconnection member and said connecting means being articulated to said lever means on opposite sides with respect to said axis, said coupling means having a second displaceable member articulated to said lever means adjacent said connecting means, said first interconnection member and said second displaceable member having mounting means for coupling implements to said tractor whereby said interconnection member and said second displaceable member are responsive to changing draft forces exerted in the direction of travel and in an opposite and excessive draft forces on either side of said lever means with respect to said axis cause the tractive effort to change for a constant engine speed.

2. The invention of claim 1 wherein said displaceable member is movable in the direction of travel and also in an opposite direction, said displaceable member being operatively associated with said transmission in both directions.

3. The invention of claim 1 wherein the connecting means is operatively associated with the transmission through an adjusting mechanism, a lever being linked to said mechanism for manual control and adjustment.

4. The invention of claim 3 wherein the connecting means and lever are operatively connected with the transmission through a coupling rod in the mechanism.

5. The invention of claim 1 wherein the connecting means comprises a slidable connecting member mounted in the frame, spring means for biasing said member in a central position, said member being slidable in two relatively opposite directions.

6. The invention of claim 5 wherein one end of said connecting member is linked to said displaceable member and the other end is linked to a coupling rod, said rod being connected to the transmission mechanism.

7. The invention of claim 1 wherein the coupling means comprises a lifting device having arms, one of said arms being the second displaceable member.

8. A tractor comprising a frame, an engine drivingly connected to a ground wheel through a transmission mechanism having a variable transmission ratio, coupling means, said coupling means having a displaceable member responsive to changing draft forces exerted on said coupling means, said displaceable member being connected to two longitudinally disposed slidable connecting members mounted in the frame, one of said members being spring biased in a direction substantially opposite to the other member, each of said members being provided with a stop which limits its spring urged direction, said members being operatively associated with said transmission to vary said ratio whereby excessive draft forces in either direction cause the tractive effort to change for a constant engine speed.

9. The invention of claim 8 wherein said connecting members are associated with said transmission through a coupling rod.

10. The invention of claim 8 wherein the coupling means comprises a lifting device having arms, one of said arms being the displaceable member.

11. The invention of claim 8 wherein the coupling means comprises an interconnection hitching member, lever means linking said hitching member to said connecting members, said hitching member and said lever means being the displaceable member.

12. The invention of claim 8 wherein compression springs are provided to bias said connecting members and including means for adjusting the compression force of said springs.

13. The invention of claim 8 wherein the coupling means includes an interconnection hitching member and a lifting device with arms, said hitching member being linked to one of said arms and said connecting members by a lever, said lever being pivotally secured to said frame at a point intermediate said hitching member and said arm whereby their relative movements are interdependent.

(References on following page)

References Cited by the Examiner

UNITED STATES PATENTS

| | | | |
|---|---|---|---|
| 1,267,742 | 5/1918 | Bulley | 180—14 |
| 1,687,719 | 10/1928 | Ferguson. | |
| 1,942,637 | 1/1934 | Best | 180—14 |
| 2,654,301 | 10/1953 | Bohmker | 180—82.1 X |
| 2,706,384 | 4/1955 | Schott | 74—60 |
| 2,922,481 | 1/1960 | Hutter | 180—14 |
| 3,024,859 | 3/1962 | Marindin | 180—14.5 |

FOREIGN PATENTS

| | | |
|---|---|---|
| 687,341 | 2/1953 | Great Britain. |
| 714,328 | 8/1954 | Great Britain. |

BENJAMIN HERSH, *Primary Examiner.*

A. HARRY LEVY, *Examiner.*